US006925122B2

(12) United States Patent
Gorodnichy

(10) Patent No.: US 6,925,122 B2
(45) Date of Patent: Aug. 2, 2005

(54) METHOD FOR VIDEO-BASED NOSE LOCATION TRACKING AND HANDS-FREE COMPUTER INPUT DEVICES BASED THEREON

(75) Inventor: Dmitry O. Gorodnichy, Ottawa (CA)

(73) Assignee: National Research Council, Ottawa (CA)

(*) Notice: Subject to any disclaimer, the term of this patent is extended or adjusted under 35 U.S.C. 154(b) by 473 days.

(21) Appl. No.: 10/201,957

(22) Filed: Jul. 25, 2002

(65) Prior Publication Data

US 2004/0017472 A1 Jan. 29, 2004

(51) Int. Cl.$^7$ ............................. H04N 7/12; G06K 9/00
(52) U.S. Cl. ................................. 375/240.16; 382/181
(58) Field of Search ................. 375/240.02, 240.16, 375/240.17, 240.03, 240.08, 240.21; 348/169, 396.1, 402.1, 406.1, 407.1, 414.1, 416.1, 417.1, 418.1; 382/181, 190, 194, 201, 220, 232, 239, 243, 249, 251–253; H04N 7/12; G06K 9/00

(56) References Cited

U.S. PATENT DOCUMENTS

| | | | | |
|---|---|---|---|---|
| 5,353,355 A | * | 10/1994 | Takagi et al. | 382/111 |
| 5,374,958 A | * | 12/1994 | Yanagihara | 375/240.04 |
| 5,686,942 A | | 11/1997 | Ball | |
| 5,852,669 A | * | 12/1998 | Eleftheriadis et al. | 382/118 |
| 5,912,721 A | * | 6/1999 | Yamaguchi et al. | 351/210 |
| 5,999,877 A | * | 12/1999 | Takahashi et al. | 701/117 |
| 6,394,557 B2 | | 5/2002 | Bradski | |
| 6,580,810 B1 | * | 6/2003 | Yang et al. | 382/103 |
| 6,597,736 B1 | * | 7/2003 | Fadel | 375/240.01 |
| 2002/0081032 A1 | * | 6/2002 | Chen et al. | 382/199 |

OTHER PUBLICATIONS

Mohan, A.; Papageorgiou, C.; Poggio, T.; Example–Based Object Detection in Images by Components; IEEE Transactions on Pattern Analysis & Machine Intelligence; vol. 23, No. 4; pps. 349–361; Apr. 2001.

Stern, H.; Efros, B.; Adaptive Color Space Switching for Face Tracking in Multi–Colored Lighting Environments; Ben–Gurion University of the Negev; pps. 1–6.

Shakhnarovich, G.; Viola, P.; Moghaddam, B.; A Unified Learning Framework for Real Time Face Detection & Classification.

Kawato, S.; Tetsutani, N.; Detection & Tracking of Eyes for Gaze–Camera Control; ATR Media Information Science Laboratories.

Hjelmas, E.; Face Detection: A Survey; University of Oslo; pps. 236–274; Apr. 2001.

Yang, M.; Kriegman, D.; Ahuja, N.; Detecting Faces in Images: A Survey; IEEE Transactions on Pattern Analysis & Machine Intelligence; vol. 24, No. 1, pps. 35–58; Jan. 2002.

* cited by examiner

Primary Examiner—Nhon T Diep
(74) Attorney, Agent, or Firm—Jones, Tullar & Cooper, PC

(57) ABSTRACT

A method for tracking the location of the tip of the nose with a video camera, and a hands-free computer input device based thereon have been described. According to this invention, a convex shape such as the shape of the tip of the nose, is a robust object suitable for precise and smooth location tracking purposes. The disclosed method and apparatus are substantially invariant to changes in head pose, user preferred seating distances and brightness of the lighting conditions. The location of the nose can be tracked with pixel and sub-pixel accuracy.

17 Claims, 4 Drawing Sheets

METHOD FOR VIDEO-BASED NOSE LOCATION TRACKING AND HANDS-FREE COMPUTER INPUT DEVICES BASED THEREON

FIELD OF INVENTION

This invention relates to location tracking of objects using video devices and using the location tracking information obtained for hands-free operation of a computer input device.

DESCRIPTION OF THE RELATED ART

U.S. Pat. No. 5,686,942 teaches a remote point object location tracking method where the nose may be the tracked object. The patent uses remote sensors, one type of which is a video-based CCD image array, for application in a computer input system. The method may work well for visually easy to detect objects, such as the cited reflective spot on the user's eye-glasses but the tip of the nose, as is any other facial feature, is not a very distinct feature for automated video image processing purposes. It is difficult to track the location of the tip of the nose with a video-based device. Some of the remote sensors disclosed in U.S. Pat. No. 5,686,942 are expensive range measuring devices such as echo-based, scanner-based, and triangulation-based systems.

U.S. Pat. No. 6,394,557 teaches a video-based location tracking method using a probability distribution of the tracked object, such as a moveable human face. The method operates by first calculating a mean location of a probability distribution within a search window. Next, the search window is centred on the calculated mean location. Calculation of the mean location and centering of the search window are then iterated until the algorithm converges. The disadvantage is that such a method may not allow for precise location tracking usable for positioning and moving a cursor on a computer screen.

SUMMARY OF THE INVENTION

According to the invention, a convex shape such as the shape of the tip of the nose, is a robust object for precise and smooth location tracking with a video camera.

In its method aspect, the invention relates to first defining an X-spot which is generally either a point on the tip of the nose closest to the video camera or slightly off from it. The thus defined X-spot moves therefore on the tip of the nose as the user changes his head pose. A video image of the X-spot and its immediate vicinity is stored as an X-luminance pattern. A reference point is defined in the X-luminance pattern, preferably in its centre location. In subsequent video frames, a best match for the stored X-luminance pattern is found by comparing luminance patterns on a pixel-by-pixel basis, thereby determining the two-dimensional location of the reference point in each video frame with pixel accuracy. The reference point location tracking method achieves sub-pixel accuracy by subsequently performing a weighted average operation on the pixel locations in the immediate neighbourhood of the location of the reference point determined with pixel accuracy.

In its apparatus aspect, the invention relates to the implementation of the reference point location tracking method using the corresponding video-based X-spot defining, X-luminance pattern storing, reference point defining, video image registering, video image comparing, and average weighting means. The two-dimensional location of the reference point is used as input to a computer for display and control related applications.

The reference point location tracking method and apparatus are invariant to rotation of the convex shape or orientation of the tip of the nose, size of the convex shape or distance of the tip of the nose to the video camera, and changes in brightness of the lighting conditions.

It is submitted, that the benefit of the invention lies in the use of video cameras for hands-free operation of a computer input device using the tip of the nose, thereby achieving pixel and sub-pixel accuracies.

DESCRIPTION OF THE PREFERRED EMBODIMENT

Figure 1:
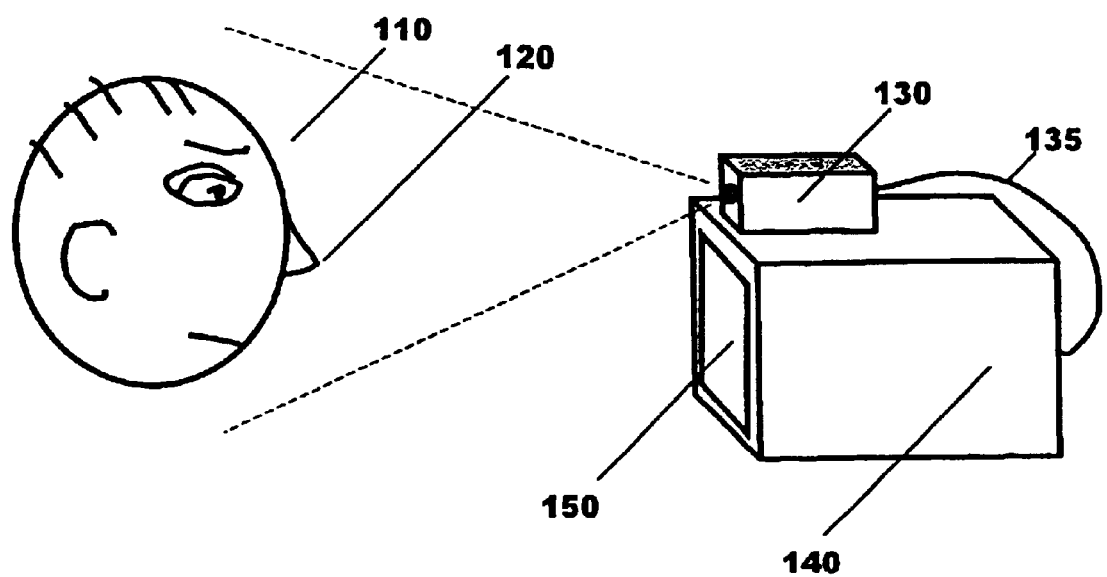
FIG. 1 Typical setup for video-based location tracking of the tip of the nose.

FIG. 1 shows a typical setup for practising the invention. A user's face 110 is facing a video camera 130 which is connected with a cable 135 to a computer 140 having a monitor 150. The user's face 110 is positioned at about an arm's length distance from the video camera 130 such that the width of the face occupies about ⅓ to about ½ of the width of the video image, such that the nose 120 is always seen, although other facial features such as eyes, eyebrows, mouth, chin, ears and hair may also be seen. In the following, the video camera 130 is assumed to be a black-and-white camera producing video images having luminance values. It is clear however, that a colour video camera producing video image pixels having luminance and chrominance values may also be used for practising the invention, although only the luminance values will be further processed for location tracking purposes. For example, only the Y-signal of a colour video camera with YUV outputs will be further processed. In yet another example, each one of the R-, G-, or B-signals of a colour video camera with RGB outputs may be used to practise the invention, since each one of the R-, G-, and B-signals contains a luminance component suitable for further processing. The video images are digitized in that the video signal is sampled into pixels and the pixels are quantized. The digitization of the video images can be done in the video camera 130 or in the computer 140 or in an interface box (not shown) between video camera 130 and computer 140.

Referring to the example situation shown in FIG. 2a, which will be made more general hereinafter, the point on the tip of the nose 120 closest to the video camera 130 is marked up by an X, which is accordingly denoted the X-spot on the tip of the nose 120. The video image of the tip of the nose 120 shows the corresponding X-spot location marked up with an X, the video image accordingly being denoted the X-luminance pattern 160. Note that the exact location of the X-spot generally falls between the pixels. Also note, that the X-spot does not generally coincide with the point of maximum brightness. In the example situation shown in FIG. 2a, the pixel with the maximum luminance value of 115, is slightly to the left and above the X-spot, which is typically caused by light in the given lighting conditions coming from a direction slightly to the left and above the user's nose 120. Moreover, the X-spot may wander on the tip of the nose as shown in FIGS. 3a to d, which show a series of poses of the user's face 110 at various distances from the video camera 130. As further shown in FIGS. 3a to d, the X-spot changes location in space relative to the stationary video camera 130.

The X-luminance pattern 160, however, is invariant to rotation of the face 110 because of the substantially constant spherical curvature of the convex shape of the tip of the nose 120. For typical head movements and distances from the video camera 130, the X-luminance pattern is moreover substantially invariant to scale. The video images from video camera 130 can furthermore be scaled with well-known image processing techniques to make the X-luminance pattern 160 invariant to changes in user preferred seating distances. In more general terms, the X-luminance pattern can be scaled to make it invariant to size of a convex shape and the distance of the convex shape to the video camera 130. The luminance values of the X-luminance pattern 160 can be normalized to make them invariant to changes of brightness in the lighting conditions.

Figure 4:
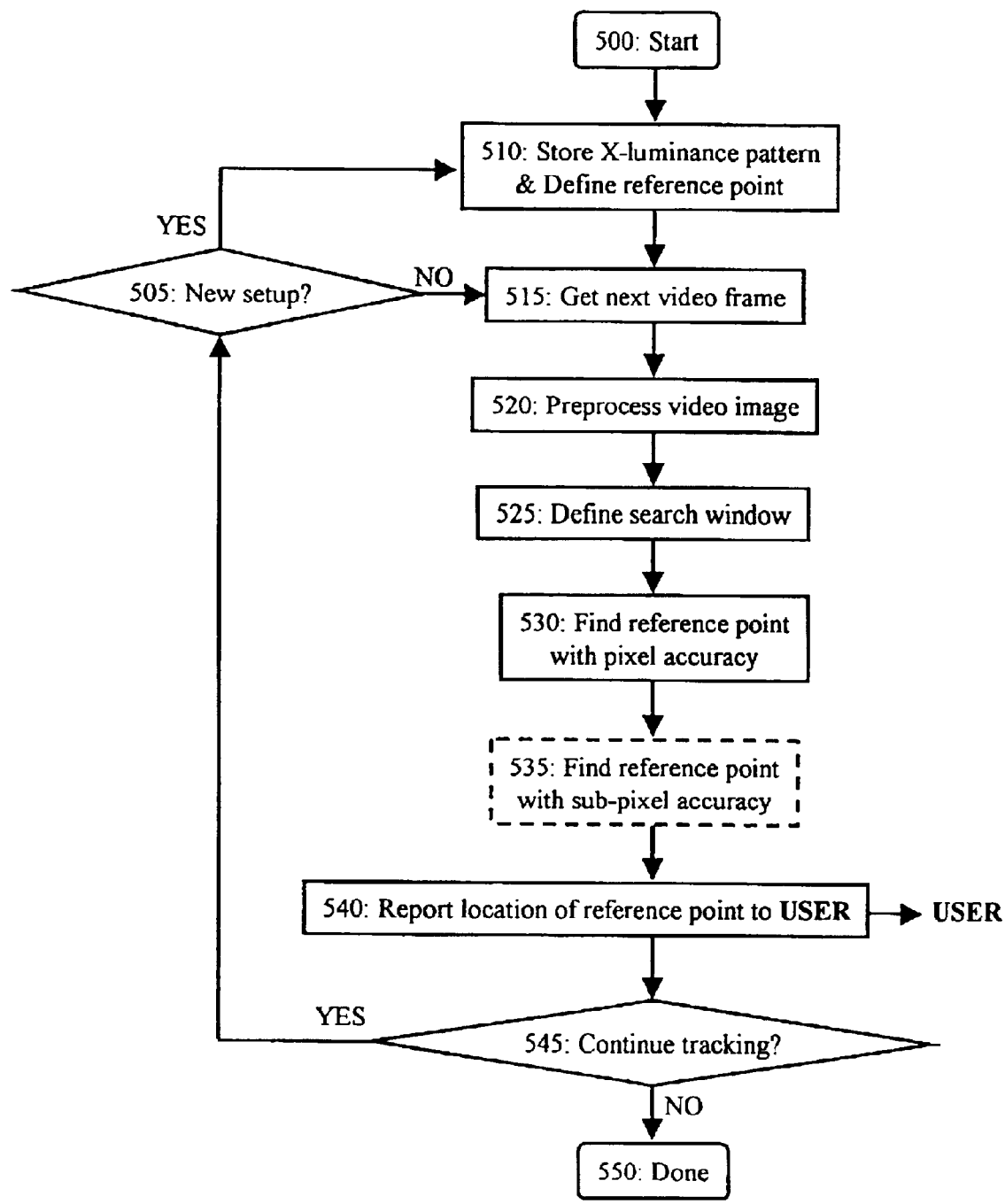
FIG. 4 Flowchart for the reference point location tracking algorithm.

The digitized video images are processed by computer 140 according to the flowchart shown in FIG. 4. In box 510, the algorithm first stores the X-luminance pattern 160. In case of a nose 120, the tip of the nose 120 is preferably positioned in the centre of the video image with the user's face 110 facing straight into the video camera 130. The width of the face 110 is preferably scaled to a width of 50 to 80 pixels. A small square area with a side length of about ⅛ the width of the face 110 centred at the tip of the nose contains the X-luminance pattern, the small square area measuring from about 7×7 pixels to about 11×11 pixels. Accordingly, the X-luminance pattern is stored as a square matrix with dimensions from about 7×7 to about 11×11. The modulus of the matrix is preferably normalized to unity prior to storage to speed up subsequent computer calculations and lowering the hardware requirements for computer 140.

Now generalizing the example situation shown in FIG. 2a and FIGS. 3a to d, if in box 510 the user does not perfectly centre the tip of the nose 120, then the user defined X-spot in the centre of the video image does not correspond to a point on the nose 120 closest to the video camera 130, but to a point on the nose 120 closest to a fixed point in space which is positioned on the normal to the convex shape of the tip of the nose 120. Referring to FIGS. 3a to d, the thus selected X-spot wanders on the nose 120 as the user changes head pose as the point on the nose 120 closest to the fixed point in space. The thus selected X-luminance pattern 160 is invariant to rotation of the face 110 just like for the special case which has been described hereinbefore for the X-spot being a point on the tip of the nose 120 closest to the video camera 130. The other invariances of the thus selected X-luminance pattern 160 are preserved as well. Specifically, the thus selected X-luminance pattern is substantially invariant to scale and user preferred seating distances, and can be made invariant to these factors using well-known image processing techniques. Moreover, the thus selected X-luminance pattern 160 can be normalized to make it invariant to changes of brightness in lighting conditions. The X-luminance pattern 160 behaves therefore identically whether or not the user has defined the X-spot as a point on the nose 120 closest to the video camera 130 or slightly off, as long as the user defined X-spot is treated in the location tracking method described hereinafter as a point on the nose 120 closest to a fixed point in space as the user changes head pose.

Furthermore in box 510, a reference point is defined at a location in the stored X-luminance pattern 160, preferably at the centre of the stored X-luminance pattern 160. As will be described in detail hereinafter, it is the location of the reference point that will be determined with pixel and sub-pixel accuracy in each subsequent video frame.

In box 515, the video image of the moveable tip of the nose 120 is registered by the video camera 130 in subsequent video frames with a generally different location of the X-luminance pattern corresponding to the generally different location of the X-spot in space.

In box 520, the video image is preferably scaled such that the video image of the user's face 110 is 60 to 80 pixels wide, if it is not already 60 to 80 pixels wide. This scaling step makes the location tracking method invariant to different user preferred seating distances from the video camera 130 or different sizes of a convex shape. An averaging filter is preferably used at this point for the reduction of noise.

In box 525, a search window is defined within the video image. The search window may cover the entire area of the video image if the location of the two-dimensional X-spot is not known from a previous video frame. If the location of the two-dimensional X-spot is known from a previous video frame, then the search window can be confined to a smaller area, preferably to a square area with a side length from about the width of the face to about a quarter the width of the face.

Preferably, the search window is defined using automated face detection techniques known in the art. The references [1] to [5] below, hereby incorporated by reference, may be used to define a rectangular search window containing the face:

[1] M.-H. Yang, D. Kriegman, N. Ahuja, Detecting Faces in Images: A Survey, IEEE Transaction on Pattern Analysis and Machine Intelligence, 24(1), pp.34–58, 2002;

[2] E. Hjelmas and B. K. Low. Face detection: A survey. Computer Vision and Image Understanding, 83(3):236–274, 2001;

[3] Shinjiro Kawato, Nobuji Tetsutani, Detection and Tracking of Eyes for Gaze-camera Control, 15th International Conference on Vision Interface, May 27–29, 2002, Calgary, Canada, pp 348–355;

[4] Gregory Shakhnarovich, Paul A. Viola, Baback Moghaddam. A unified Learning Framework for Realtime Face Detection and Classification, pp 10–15, $5^{th}$ International Conference on Automatic Face and Gesture Recognition, May 20–21, 2002—Holiday Inn Capitol, Washington, D.C., USA; and

[5] Boris Efros and Helman Stern Adaptive Color Space Switching for Face Tracking in Multi-Colored Lighting Environments, pp 249–254, 5th International Conference on Automatic Face and Gesture Recognition, May 20–21, 2002—Holiday Inn Capitol, Washington, D.C., USA.

It is conceivable that automated face tracking techniques can be made more precise using the tip of the nose location tracking method disclosed herein.

In the more general case of tracking the location of a convex shape, the search window may be defined using automated object detection techniques known in the art. For example, a background subtraction technique may be used, which stores the image of the background and then cancels all pixels in the image which coincide with the background pixels. For other examples of automated object detection techniques, please see references [1] and [2] in the above as well as Mohan, A., C. Papageorgiou and T. Poggio, Example-based Object Detection in Images by Components, IEEE (PAMI), Vol. 23, No. 4, pp. 349–361, April 2001.

In box 530, the search window is searched on a pixel-by-pixel basis for a luminance pattern that best matches the stored X-luminance pattern. The best match determines the location of the registered X-luminance pattern 170 shown in FIG. 2b, thereby determining the location of the reference point with pixel accuracy, the location being marked with an R. Note that R is located at a pixel location. The comparison leading to the best match is preferably done by performing a mathematical normalized correlation operation using the normalized square matrices of the stored X-luminance pattern and the corresponding registered luminance values. In addition to speeding up subsequent computer calculations and lowering the hardware requirements for computer 140, normalizing the luminance values makes the tracking algorithm invariant to changes in brightness in the lighting conditions.

In box 535, the location of the reference point can be determined with greater, sub-pixel accuracy, through the use of an average weighting operation on the pixel locations in the neighbourhood of the R location found with pixel accuracy. The neighbourhood is comprised of the R location itself and at least one of the immediate neighbour pixels. For example, the average weighting operation can be performed in a square area of 3×3 pixels with R at the centre location. Each pixel location is given a weight which is proportional to the correlation between the corresponding elements of the stored matrix and the registered matrix at that pixel location. The average weighting operation determines the location of the reference point with sub-pixel accuracy, the location being marked with an r in FIG. 2b. Note that r is located between pixel locations within one pixel distance of the R location.

Figure 2:
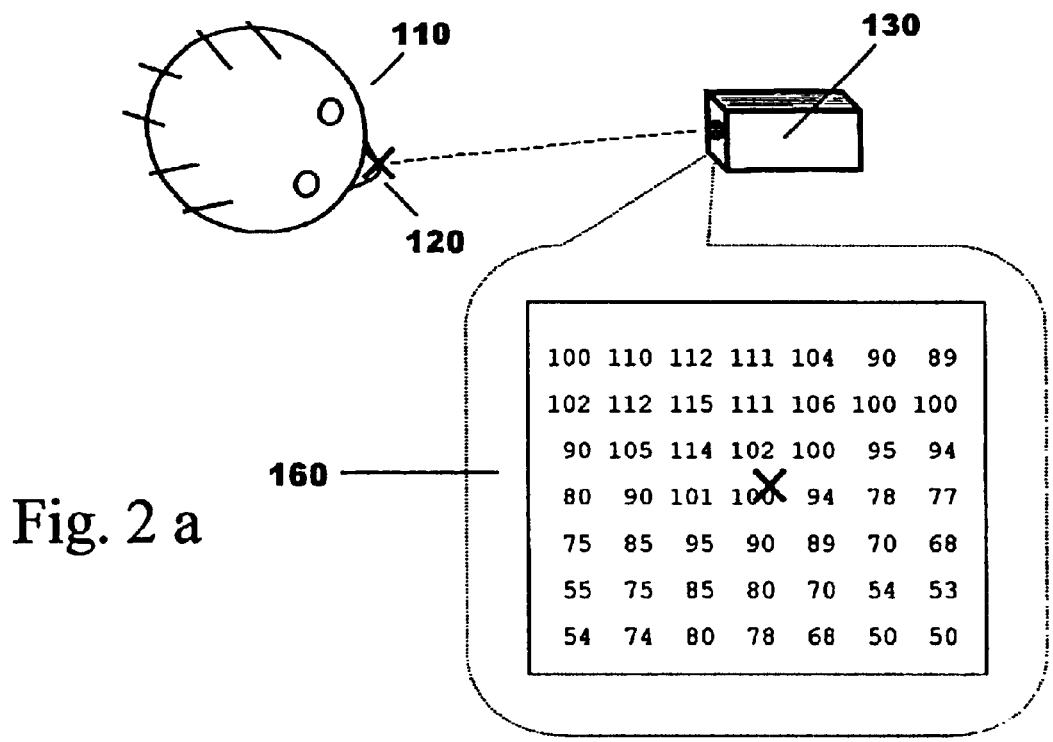
FIG. 2a The X-spot and the stored X-luminance pattern.
FIG. 2b The registered X-luminance pattern showing the location of the reference point determined with pixel accuracy R and the location of the reference point determined with sub-pixel accuracy r.
Figure 2:
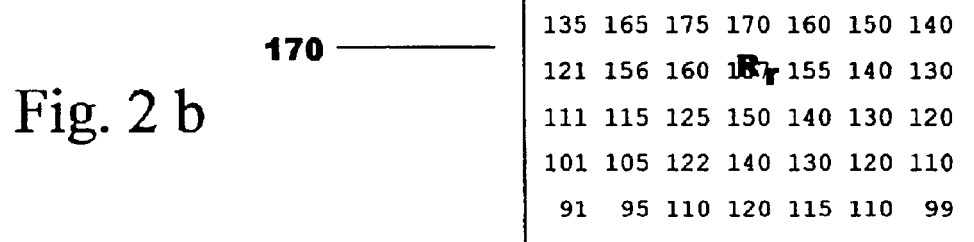
Figure 3:
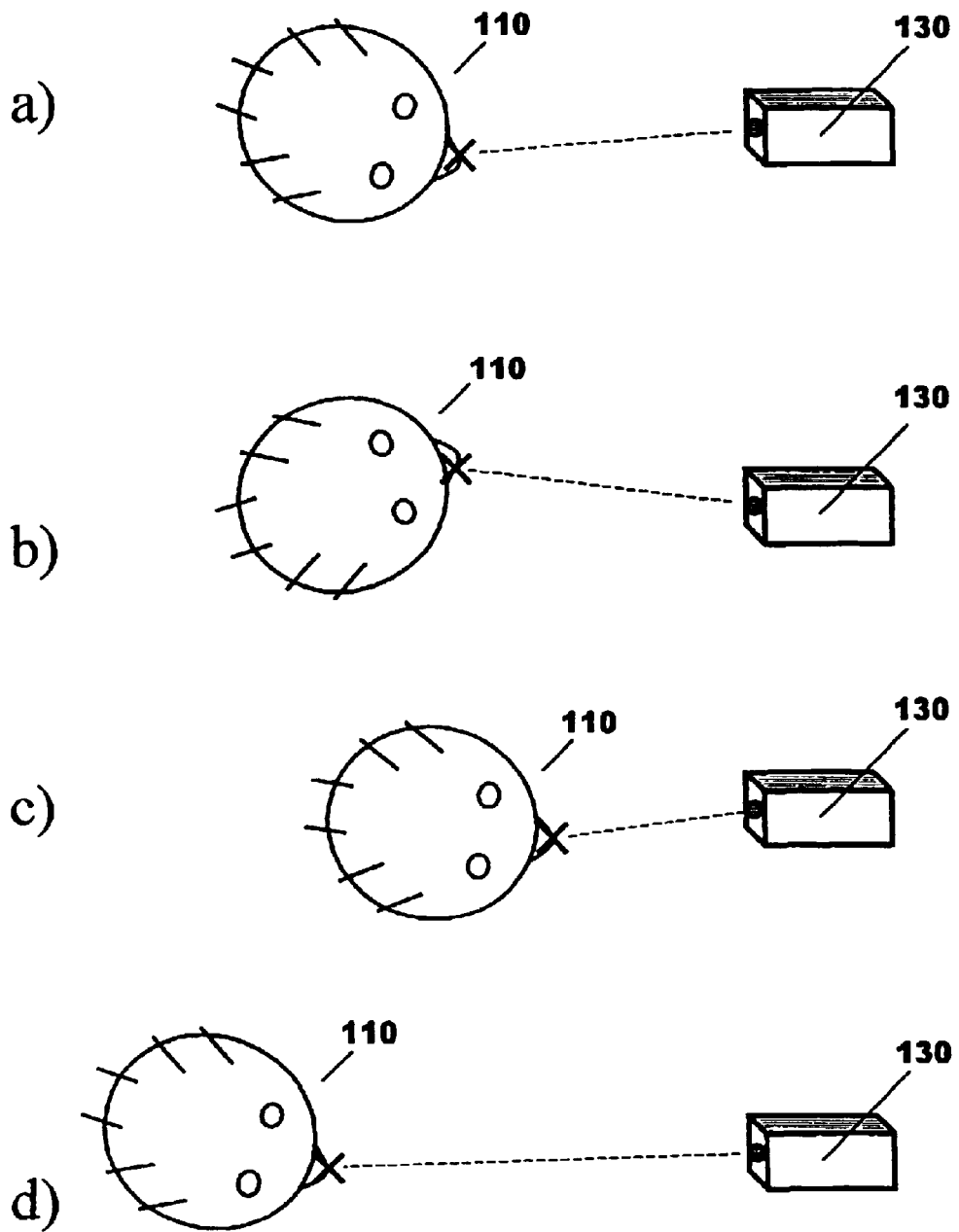
FIGS. 3a to d The X-spot in various poses of user's head and at various seating distances from the video camera.

Comparing FIGS. 2a and b, we note that the locations of the X-spot, R, and r, do not coincide, but are close to each other if the location of the reference point is defined at the centre of the stored X-luminance pattern. This is generally true, for example, if the relative position of the light source, the video camera, and the tracked convex shape do not change drastically during the tracking. Note that in boxes 530 and 535 the location of the X-spot as the point on the nose closest to the video camera or to a fixed point in space, is not determined by measuring or calculating any distances. Rather, the location of the nearby reference point is determined through the comparison steps in boxes 530 and 535.

We note at this point, that sub-pixel accuracy in the determination of the reference point is possible because of the continuity property of a convex shape, meaning that the luminance values of the X-luminance pattern surrounding the X-spot change gradually and smoothly. For further details, please refer to the shape from shading theory as elucidated, for example, in B. K. P. Horn, "understanding image intensities", Artificial Intelligence, Vol. 8, pp. 201–231, 1977.

In box 540, the location of the reference point at the time of the video frame is reported to a user, generally as data or control information to a computer. For display related uses, such as operating a computer mouse, pixel accuracy is generally adequate. For other uses, input for general control applications, sub-pixel accuracy may be required. Since sub-pixel accuracy is not always needed, and average weighting is a processing intensive operation, box 535 is therefore drawn with dotted lines.

In box 545, the flowchart provides for a continuation of the location tracking operation for subsequent video frames. Box 505 thereby checks for a change in the setup described in FIG. 1. If there are no changes in the setup, then the video image in the next video frame gets registered and the location determination and tracking of the reference point continues for subsequent video frames. If the setup changes, then the user has the option to branch to box 510 to store a new X-luminance pattern corresponding to the new setup.

As will now be evident to a person skilled in the art, the central idea of the invention can be used in a variety of embodiments. For example, the location of two X-spots can be tracked, allowing two users to play a video tennis game on a computer screen using their noses as their video tennis rackets. Variations of the described embodiments are therefore to be considered within the scope of the invention.

What is claimed is:

1. A method for tracking the location of a moveable three-dimensional convex shape with a video camera, comprising the steps of:

step a: defining the location of an X-spot on said convex shape, said location being selected from the group consisting of a point on said convex shape closest to the video camera, and a point on said convex shape closest to a fixed point in space, said location being moveable on said convex shape as said convex shape changes location and orientation in space;

step b: storing a digitized video image of said convex shape in a vicinity of said X-spot, the size of said vicinity being defined by the surface area of said convex shape with a substantially constant spherical curvature, said digitized video image having a luminance pattern referred to as a stored X-luminance pattern, said stored X-luminance pattern being stored as a stored matrix;

step c: defining the location of a reference point selected from the group consisting of the centre of said stored X-luminance pattern, and a location within said stored X-luminance pattern;

step d: registering a plurality of digitized video images, each one of said plurality of video images containing a video image of said convex shape which is referred to as a registered X-luminance pattern, said registered X-luminance pattern being of the same size as said stored X-luminance pattern, each one of said plurality of video images being registered as a registered matrix;

step e: comparing said stored matrix and said registered matrix in each one of said plurality of video images on a pixel-by-pixel basis to determine the two-dimensional location of said reference point in each one of said plurality of video images with pixel accuracy; and step g: producing the two-dimensional location of said reference point as information useable by a computer in each one of said plurality of video images;

said method being substantially invariant to rotation of said convex shape.

2. The method according to claim 1, further comprising a step f, said step f being performed after said step e and prior to said step g, said step f performing an average weighting operation in each one of said plurality of video images, said operation being performed in a neighbourhood of the two-dimensional location of said reference point determined with pixel accuracy on a pixel-by-pixel basis, said neighbourhood being comprised of the pixel location of said reference point determined with pixel accuracy and at least one of the immediate neighbour pixel locations, said operation giving a weight to each one of the two-dimensional pixel locations which is proportional to the correlation between the corresponding elements of said stored matrix and said registered matrix at that pixel location, said operation determining the two-dimensional location of said reference point in each one of said plurality of video images with sub-pixel accuracy within one pixel distance of the two-dimensional location of the reference point determined with pixel accuracy.

3. The method according to claim 1, wherein the modulus of the stored matrix and the modulus of the registered matrix are normalized to unity, resulting in said method being substantially invariant to changes in brightness in lighting conditions.

4. The method according to claim 1, wherein the comparison in step e is performed by performing a mathematical normalized correlation operation.

5. The method according to claims 1, wherein step d is further comprised of scaling each one of said plurality of video images to make said method invariant to the size of said convex shape and the distance of said convex shape from the video camera.

6. The method according to claim 1, wherein step d is further comprised of filtering each one of said plurality of video images with an averaging filter for the reduction of noise.

7. The method according to claim 5, wherein step d is further comprised of filtering each one of said plurality of video images with an averaging filter for the reduction of noise.

8. The method according to claim 1, wherein step e is further comprised of defining a search window in each one of said plurality of video images within which said comparison is performed, said search window being selected from the group consisting of:

a. a search window covering a substantially square area which is smaller than the video image area of a video frame, the centre of said area being substantially at the location of the reference point in the previous video image of said plurality of video images, if said location is known, b. a search window covering an area determined by an automated object detection technique, and c. a search window covering the entire video image area of a video frame.

9. The method according to claim 1, wherein said convex shape is the shape of the tip of a nose in a face, said step a being further comprised of positioning said tip of a nose at a substantially centre position in a video image with said face facing straight into a video camera.

10. The method according to claim 9, wherein step e is further comprised of defining a search window in each one of said plurality of video images within which said comparison is to be performed, said search window being selected from the group consisting of:

a. a search window covering a substantially square area having a side length ranging from a quarter the width of said face to the width of said face, said area having a centre at the location of the tip of the nose in the previous video image of said plurality of video images, if said location is known, b. a search window covering a substantially rectangular area determined by an automated face detection technique, and c. a search window covering the entire video image area of a video frame.

11. The method according to claim 9, wherein each one of the digitized video images is scaled such that the width of the face in each one of the scaled video images is between 50 and 80 pixels wide, and wherein the stored X-luminance pattern is stored as a square matrix with dimensions ranging from 7×7 to 11×11.

12. An apparatus for tracking the location of a moveable three-dimensional convex shape with a video camera, comprising:

a. means defining the location of an X-spot on said convex shape, said location being defined from the group consisting of a point on said convex shape closest to the video camera, and a point on said convex shape closest to a fixed reference point in space, said location being moveable on said convex shape as said convex shape changes location and orientation in space;

b. means storing a digitized video image of said convex shape in a vicinity of said X-spot, the size of said vicinity being defined by the surface area of said convex shape with a substantially constant spherical curvature;

c. means defining the location of a reference point selected from the group consisting of the centre of said stored video image, and a location within said stored video image;

d. means registering a plurality of digitized video images, each one of said plurality of video images containing a video image of said convex shape;

e. means comparing said stored video image to each one of said plurality of video images to determine the location of said reference point in each one of said plurality of video images with pixel accuracy; and g. means producing the location of said reference point in each one of said plurality of video images as information useable by a computer;

said apparatus being substantially invariant to rotation of said convex shape.

13. The apparatus according to claim 12, further comprising means performing an average weighting operation on pixel locations in each one of said plurality of video images to determine the location of said reference point in each one of said plurality of video images with sub-pixel accuracy.

14. The apparatus according to claim 12, wherein the storing means and the registering means are further comprised of a normalizing means, resulting in said apparatus being substantially invariant to changes in brightness in lighting conditions.

15. The apparatus according to claim 12, wherein the comparing means performs a mathematical normalized correlation operation.

16. The apparatus according to claim 12, wherein the registering means is further comprised of a scaling means for scaling each one of said plurality of video images, resulting in said apparatus being invariant to the size of said convex shape and the distance of said convex shape from the video camera.

17. The apparatus according to claim 12, wherein said convex shape is the shape of the tip of a nose, said apparatus therefore being useable as a hands-free computer input device.

* * * * *